UNITED STATES PATENT OFFICE.

WILLIAM FRISHMUTH, OF PHILADELPHIA, PENNSYLVANIA, ASSIGNOR TO HIMSELF, AND GEORGE R. BLANCHARD AND EMERSON FOOTE, OF NEW YORK, N. Y.

PROCESS OF EXTRACTING ALUMINIUM FROM CORUNDUM, &c.

SPECIFICATION forming part of Letters Patent No. 282,622, dated August 7, 1883.

Application filed March 9, 1883. (Specimens.)

*To all whom it may concern:*

Be it known that I, WILLIAM FRISHMUTH, of Philadelphia, in the county of Philadelphia and State of Pennsylvania, have invented or discovered a new and useful Process for Extracting Aluminium from Corundum, Bauxite, and other substances containing the metal; and I do hereby declare that the following is a full, clear, and exact description of the invention or discovery, which will enable those skilled in the art to practice or use the same.

Heretofore the practiced method of extracting aluminium from its ores, or from the various substances containing it, has been to first change the alumina into the chloride of aluminium, and then separate the metal therefrom by the use of metallic sodium as a reagent. My process or method differs materially from this, as it consists in forming the chloride of aluminium and then producing the metal therefrom by the action of sodium gas or vapor generated by heating a mixture of carbonate of soda with charcoal, such gas or vapor being brought into immediate contact with the chloride, and thus dispensing altogether with the use of metallic sodium.

In practicing my discovery or invention I take the required amount of corundum, bauxite, or other substance carrying aluminium, and mix therewith, say, ten per cent. of fluoride of soda or potash, and, if found desirable, about an equal amount of fluor-spar. This mixture may be placed in crucibles, or upon the hearth of a furnace, where it is heated to the calcining point, and when properly calcined it is removed from the furnace and ground to a powder. At the time of this grinding about ten per cent. of charcoal, or an equivalent amount of some other carbonaceous substance, (such, for example, as starch or oil,) is added to the calcined material, the whole being thoroughly mixed together and made up into balls with or without the aid of water, when it is placed in a muffle or retort, in which it is baked and converted into a spongy mass. The mass having been treated as above described, or substantially so, is to be taken from the muffle or retort and placed in another retort, which may be placed either vertically or horizontally, and a stream of chlorine gas is made to pass through it for the purpose of converting it into chloride of aluminium, which is distilled over into a separator or reservoir, the heat applied to the retort being sufficient to pass the chloride over as fast as it is formed into the reservoir, where the chloride is collected. In obtaining fluoride of aluminium from the native bauxite, corundum, or similar ores, it is found in practice that the salt is more or less contaminated with iron and other impurities, and for this reason it is desirable to decompose the fluoride of aluminium with chlorine gas, as stated, and the volatilized chloride thus obtained is found to be separated from the injurious elements named. This chloride of aluminium may then be taken and placed in another retort, in which it is converted into aluminium; or it may be passed while in its gaseous form, through a vessel or chamber containing iron-turnings or other small pieces of iron, and into a vessel prepared for its reception, where it is solidified and formed into crystals, the object of passing it over the iron-turnings being to extract from the chloride any iron that it may contain.

In reducing the chloride to the metal I employ a furnace having in it a retort made of fire-clay or other refractory substance, and of such dimensions as may be required, and on it place such an amount of the chloride as it is desirable to treat at one time, said furnace or retort being connected with another of similar construction by a pipe, through which is caused to pass a current of gas generated by placing in a proper retort or furnace say twenty parts, by weight, of carbonate of soda, sixteen, by weight, of charcoal, or an equivalent amount of other carbonaceous substance, and five parts, by weight, of chalk or lime, well mixed together and dried, and then put into bags or packages of asbestus, strong paper, or other substance that will retain the package in form while being heated. When the chloride is in its retort heat is applied to it and to the one in which the material to be gasified is placed, the temperature of the last-named one being raised to such a degree as to cause sodium-vapor to be produced in it, and to pass from it into the retort containing the chloride, the effect of which is to cause a separation of metallic aluminium from the earthy matter with which it is associated to take place, the metal being deposited upon the hearth of the retort, from which it may be drawn and cast into ingots.

It will, it is believed, be found that this process is applicable to the treatment of other metals or elements—as, for example, magnesium, boron, or to other substances containing the same. I do not therefore limit my invention or discovery to its application to substances containing aluminium only, but intend to claim the right to apply it to such other substances as it may be applicable to.

It will be seen in this process that the production of sodium-vapor is going on simultaneously with its action as a reducing agent upon the aluminium compound. Moreover, equivalents for the substances here named may be employed, and some of the substances named may be omitted without entirely destroying all useful results.

I am aware of an article on the metal aluminium published in Watts' Dictionary of Chemistry, volume I, page 150, in which there is described a method of separating aluminium from its chloride by the use of a vapor generated from metallic sodium, such vapor being conducted into a vessel, in which the chloride is thrown from time to time.

In the above-described process the heat used in reducing the chloride to the metal is obtained by the burning of the vapor itself within the vessel, in which the action of separating the metal takes place. This differs essentially from my process in that I apply the necessary heat externally to the vessel containing the chloride, such heat resulting from the burning of coal or other ordinary fuel, by which means a great reduction in the cost and increase of yield is obtained.

I am also aware that the method of generating sodium-vapor herein described has been heretofore employed, and these steps I do not claim; neither do I intend to cover in this case the reduction of fluorides direct, as set forth in my pending application, Serial No. 87,649.

Having thus described my invention or discovery, what I claim, and desire to secure by Letters Patent, is—

1. The process of producing metallic aluminium which consists in first calcining and roasting the compound containing aluminium, together with fluor-spar, fluoride of soda, or other material containing fluorine, then converting the fluoride of aluminium thus produced into chloride of aluminium, then mixing this chloride with carbonaceous material, and then subjecting the mixture to a high temperature, and simultaneously to the action of sodium-vapor produced from a mixture of a sodium compound and carbon, substantially as described.

2. The process of producing metallic aluminium which consists in mixing the chloride of aluminium with carbonaceous material and then subjecting the mixture to a high temperature and simultaneously to the action of sodium-vapor produced from a mixture of a sodium compound and carbon, substantially as described.

WILLIAM FRISHMUTH.

Witnesses:
EMERSON FOOTE,
FRANCIS B. CROCKER.